United States Patent

[11] 3,618,722

| [72] | Inventors | Paul W. Eschenbach<br>Inman, S.C.;<br>Howard N. Watrous, Cincinnati, Ohio |
|---|---|---|
| [21] | Appl. No. | 58,481 |
| [22] | Filed | July 27, 1970 |
| [45] | Patented | Nov. 9, 1971 |
| [73] | Assignee | The Procter & Gamble Company<br>Cincinnati, Ohio |

[54] CYCLIC CLUTCH
29 Claims, 10 Drawing Figs.

[52] U.S. Cl. ................................................. 192/48.9,
74/84, 74/394, 192/67 P, 192/84 P, 192/103 R
[51] Int. Cl. .......................................... F16d 23/10,
F16h 35/02
[50] Field of Search ........................................... 192/48.9,
48.91, 67 R, 67 P, 103 R; 74/84, 394

[56] References Cited
UNITED STATES PATENTS
2,309,595  1/1943  James ........................... 74/394

| 2,333,105 | 11/1943 | James | 74/394 X |
| 3,173,525 | 3/1965 | Hergert | 74/394 X |
| 3,407,678 | 10/1968 | Steinke | 74/394 |

*Primary Examiner*—Allan D. Herrmann
*Attorneys*—John V. Gorman and Richard C. Witte ABSTRACT: A cyclic phasing clutch is described which is capable of losing one or more integral revolutions of the load while the input shaft rotates at constant speed. Two acceleration-deceleration generators, the output angular velocities of which vary cyclically, are employed with the outputs thereof out of phase with one another by approximately 360° of clutch input shaft rotation. A device is provided for selectively engaging the clutch output shaft with the clutch input shaft, with the output shaft of either acceleration-deceleration generator or, if desired, with a stationary locking means. The preferred type of acceleration-deceleration generator is a drag link using an elliptical input constraint.

PATENTED NOV 9 1971
3,618,722
SHEET 1 OF 5
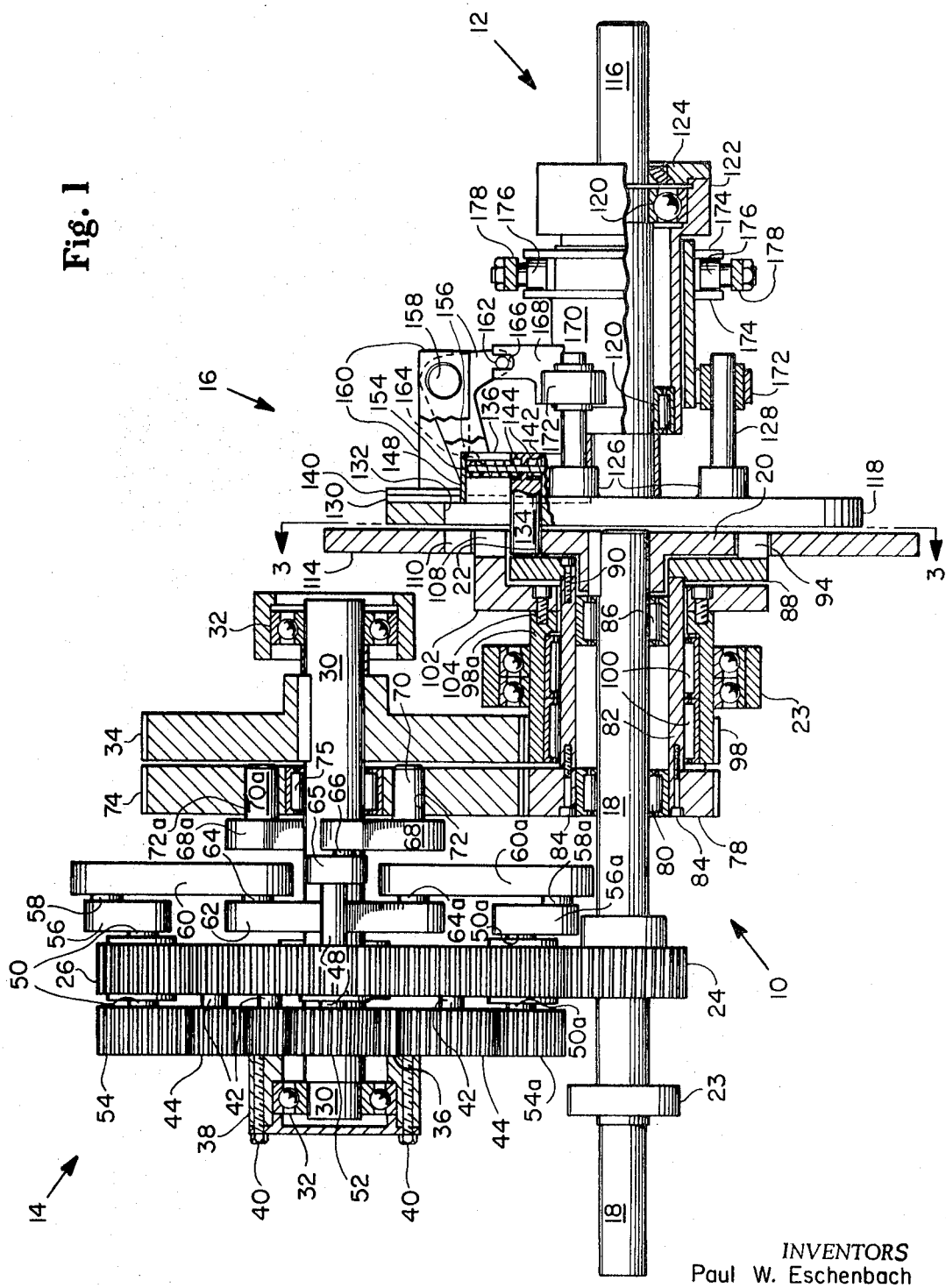
Fig. 1
INVENTORS
Paul W. Eschenbach
Howard N. Watrous
BY 
ATTORNEY INVENTORS
Paul W. Eschenbach
Howard N. Watrous
BY
ATTORNEY

Fig. 5

Fig. 6A SYNCHRONOUS POSITION - ADG 1

Fig. 6B ⊕ POSITION MIN. VEL. ADG 1

Fig. 6C AN INTERMEDIATE POSITION

Fig. 6D SYNCHRONOUS POSITION - ADG 2

Fig. 6E ⊕ POSITION MIN. VEL. ADG 1

INVENTORS
Paul W. Eschenbach
Howard N. Watrous
BY
ATTORNEY

CYCLIC CLUTCH

FIELD OF THE INVENTION

This invention relates to a cyclic clutch and, more particularly, to a cyclic phasing clutch for production equipment wherein upon detection of the need, an integral number of cycles of one machine must be lost while maintaining exact phase relationship with another machine.

In production machine operation it is frequently necessary or highly desirable to stop an auxiliary portion of the machine for one or more machine cycles and then resume operation of this portion of the machine while the main section of the machine continuously operates at normal speed. In many of these cases, the auxiliary mechanism must be declutched during a specific portion of the machine cycle, lose an exact integral number of machine cycles with respect to the main machine, and be restarted and reengaged with the main machine in an exact phase relationship which cannot be allowed to creep or vary. Where the auxiliary mechanism has appreciable inertia and operation speeds are high, severe shock loads are encountered when the declutching-reclutching is done with a standard one-revolution clutch. In an effort to solve the problem, acceleration-deceleration units having three-gear drives have been developed for use with the one-revolution clutch. However, such clutch units are believed restricted in application to the moderate speed-load range.

Greater demands on new machinery require that a different concept in clutching is needed to realize:
1. operation at higher speeds,
2. appreciable inertia load capacity,
3. preservation of an exact phase relationship,
4. inherent dynamic balance, and
5. elimination of excessive shock loading.

For example, consider a conveyor belt which receives a product module at the rate of 500 units per minute. The time between modules is called a machine cycle, which can always be modified to correspond to one revolution. Due to rejects occurring at an upstream quality control station, an irregular pattern of arrival can occur. A downstream operation requires that module rank be preserved and, in addition, the module is sensitive to tipping. It is apparent that if this conveyor is to operate with an intermittent motion on demand, smooth operation is essential.

OBJECTS OF THE INVENTION

It is an object of the present invention to provide a clutch which will obviate the above-described problems.

It is a further object of this invention to provide a cyclic clutch capable of smoothly operating at high speed and with appreciable inertia load capacity.

It is a still further object of the present invention to provide a cyclic phasing clutch having inherent dynamic balance and which is capable of performing smoothly, without excessive shock loading, under high-speed high-load conditions.

It is another object of the present invention to provide a cyclic phasing clutch employing harmonic-motion-type acceleration-deceleration generators.

SUMMARY OF THE INVENTION

In accordance with one aspect of the present invention there is provided a cyclic phasing clutch comprising normal drive means rotating at constant speed, a clutch output drive adapted to transmit rotary motion to equipment driven by the clutch, a pair of acceleration-deceleration generators driven at a constant speed directly related to the speed of the normal drive means and a means for selective engagement of the clutch output drive with the normal drive means or with the output of either of the acceleration-deceleration generators.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings in which:

FIG. 1 is an elevational view, partly in section, of a preferred embodiment of a clutch of the present invention;

FIG. 5 is a view of a binary logic diagram of a sensing system for the selective control apparatus of FIG. 4; and FIGS. 6A through 6E are schematic elevational views of the approximate relative positions of various elements of the clutch during operation.

DESCRIPTION OF THE PREFERRED EMBODIMENT

Figure 2:
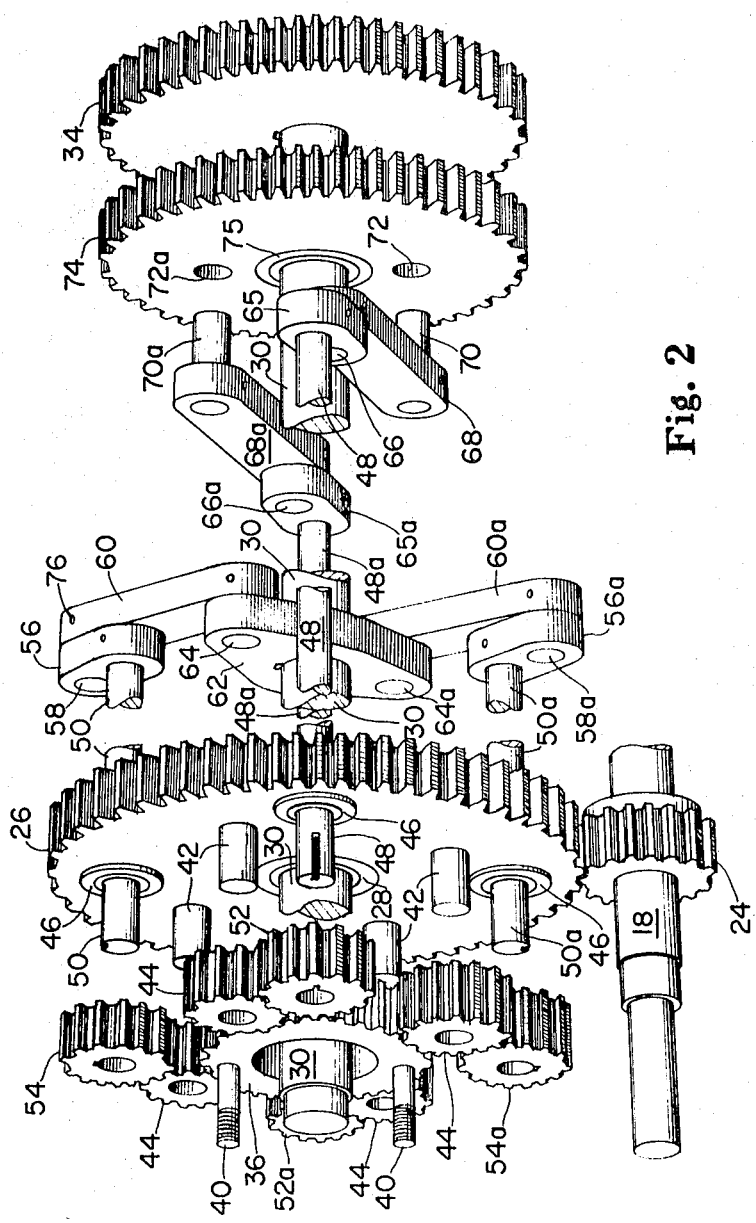
FIG. 2 is an exploded fragmentary perspective view of the acceleration-deceleration generators of the clutch of FIG. 1.

Referring to FIG. 1, there is shown a preferred embodiment of the cyclic phasing clutch of the present invention, comprising a normal drive means 10, a clutch output drive 12 adapted to transmit rotary motion to equipment driven by the clutch, a pair of acceleration-deceleration generators 14, and means 16 for selective engagement of the clutch output drive 12 with the normal drive means 10 or with the cyclical output produced by either of the acceleration-deceleration generators (ADG's) 14. In order to simplify the disclosure, the machine frame, housings and the like have been omitted since the details thereof are matters well within the design capability of one of ordinary skill in the art. This clutch can, for example, be used to drive equipment such as packaging machinery, article assembly machinery and, in general, with any type of equipment wherein an exact phase relationship must be maintained with the output of associated devices.

The normal drive means 10 can comprise any appropriate drive system for transmitting constant speed rotary motion to the clutch output drive 12. In the illustrated embodiment, the normal drive means 10 comprises clutch input shaft 18 and clutch plate 20. Power is derived from a source, not shown, but which could be from a coupling mounted in a main drive shaft, from a gear train or from any convenient means rotating at a constant speed directly related to that powering the associated devices. Whatever the source, the clutch input shaft 18 is rotated at a constant speed equal to that required by the equipment driven by the clutch in order to stay in exact phase with the associated devices under normal operating conditions. Clutch plate 20, which is keyed to the end of shaft 18 adjacent the means 16 for selective engagement, is (as shown most clearly in FIGS. 3 and 4) provided with a radially oriented slot 22 extending inwardly from the periphery of the clutch plate 20. Redirecting attention to FIG. 1, bearings 23 which can be mounted as desired within the machine frame or housing (not shown), serve to support the shaft 18 and the clutch parts carried thereby.

The ADG's 14 are driven at constant speed input by gear 24 keyed to shaft 18. Alternatively, of course, the drive could be derived from a different source so long as it is directly proportional in speed to that of shaft 18.

The ADG's 14 can each comprise any type of device which is adapted to produce a satisfactory cyclical output from a constant speed input and, according to the type of device used, the arrangement of the ADG section of the clutch will be appropriately changed. For example, ADG's comprising the three-gear drive can be used, as can the geared drag link and chain-sprocket devices. With respect to the three-gear drive, see the following, the disclosure of each of which is hereby incorporated by reference: Hillard Corporation, "Clutches, ADU Drives," Bulletins 239, 800, Elmira, N.Y.; Kaplan, J. and Korth, H., "Cyclic Three-Gear Drives," Machine Design, Mar. 19, 1957, pp. 185–188; Rappaport, S., "Kinematics of Intermittent Mechanisms IV - The Three-Gear Drive," Product Engineering, Jan. 1950, pp. 120–123; and Hirschhorn, J., "New Equations Locate Dwell Position of Three-Gear Drives," Design News. The geared drag link will be better understood from the following, the disclosure of each of which is hereby incorporated by reference: Meyer W., "Plane and Spherical Coupled Rotary Drives as Rest Gears," translated from "Ebene und spharische Koppelradertriebe als Rastgetriebe," Industrie-Anzeiger, 85, No. 76, pp. 1709–1714, Sept. 20, 1963; and Hain, K., "Geared Four-Bar Linkages," Machine Design, Oct. 11, 1962, pp. 195–199. Similarly, chain-sprocket devices will be better understood from the following, the disclosure of each of which is also hereby incorporated by reference: Remmele Eng., Inc. "Intermittent Motor Drives," St. Paul Minn.; and Chironis, N.P., "Gear Design and Application," Product Engineering, Mc-Graw-Hill Book Co., 1967, Chapter 13.

In order to be satisfactory, the cyclical variations in the angular velocity of each ADG output shaft must be similar to a harmonic velocity curve. This type of cyclical variation will be herein generally characterized as "sinusoidal," meaning varying in amplitude somewhat like a curve of sines which is displaced upwardly so that the minimum equals approximately zero. The cyclical variations should have a maximum which is approximately equal to the angular velocity of the normal drive means 10 and a minimum of about zero, the said maximum and minimum being effective throughout the time required for a finite amount of rotation of the normal drive means 10. Moreover, a plot of the angular velocity of the output shaft driven by each ADG (ordinate) against time (abscissa) should preferably be essentially smooth. The plot of the angular acceleration of the output shaft driven by each ADG (ordinate) against time (abscissa) should preferably be devoid of regions of steep slope and the extremes of the curve should preferably be similar and small in absolute number.

The preferred type of ADG for use in connection with the present invention is the Cardan drag link, a drag link having an elliptical input constraint, whereby one pin joint of the coupler link is constrained to an elliptical path while the other pin joint is constrained to a circular path. This form of mechanism and the calculations, definitions and the like related thereto are found in the following, the disclosures of each of which is hereby incorporated by reference: Eschenbach, P. "Cyclic Phasing Clutch Using a Cardan Drag Link," Journal of Mechanisms, Vol. 5, No. 1 (Spring 1970) pp. 89–103; and Steinke, U.S. Pat. No. 3,407,678, issued Oct. 29, 1968 on "Mechanism for Producing Rotary Output Motion with Harmonic Displacement Characteristics." In connection with the patent reference, it will be noted that the embodiment of FIGS. 13–18 and the specification description thereof particular relevance to the preferred embodiment of the present invention.

For the purpose of this disclosure it will suffice to say that the elliptical input constraint is developed by Cardan motion and that Cardan motion is a special case of cycloidal motion in which a circle rolls internal to a fixed circle of a doubled radius. Any point chosen within the rolling circle will generate an ellipse. Applying this principle, an eccentric point on a pinion engaged within an internal gear having a pitch diameter twice that of the pinion will generate an ellipse; as would a similar eccentric in a cognate epicyclic arrangement in which the pinion is engaged, through an intermediate idler, with the toothed exterior of a gear having a doubled pitch diameter. Although either type of Cardan motion generation apparatus can be used, the latter, epicyclic, type is preferable inasmuch as it permits the clutch to be scaled down in size. It is the preferred epicyclic type which is shown in FIGS. 1 and 2 of the present application.

When using a Cardan drag link it will be noted that for each revolution of input, one cyclical revolution of output will be produced which has two complete cycles of acceleration-deceleration-hesitation. Where the center of the ellipse coincides with the axis of revolution of the output link, the cycles are identical and symmetrical. This condition permits the use of an output link with a length double that which would be otherwise required. The output link can then be made to revolve about its center and be provided with a pin joint for a coupler link at each end. The extra coupler link can be associated with a second pinion located in a position diametrically opposite the first, with the eccentric thereon being located such that it is the inverted mirror image of that on the other pinion. Such an approach reduces the load on the coupler links and dynamically balances the system to permit high-speed operation of equipment employing the described principle of operation. The embodiment of FIGS. 1 and 2 is dynamically balanced in this way, as will be more fully understood from later description.

Referring to FIG. 2, there is shown the ADG ADG's 14 of the preferred embodiment of the present invention. ADG input gear 26 is engaged with and driven at constant speed by gear 24, and is freely rotatably mounted on a bearing 28 on shaft 30, which (as shown in FIG. 1) is supported at each end by bearings 32. ADG output gear 34 is keyed to the end of shaft 30 opposite that at which input gear 26 is located. The shaft 30 passes through the open center of sun gear 36 which is nonrotatably affixed by nuts and bolts 40 to bearing housing 38 (FIG. 1), which is, in turn, fastened by means (not shown) to the machine frame.

ADG input gear 26 carries four studs 42 (FIG. 2) uniformly spaced along a line of centers on one side. The studs 42, which can comprise pins pressed into properly sized holes in the body of ADG input gear 26, are adapted to function as the shafts on which idler gears 44 are rotatably mounted while engaged with the teeth of stationary sun gear 36. Four equally spaced bearing arrangements 46 are provided within apertures located along another line of centers on the ADG input gear 26. The bearing arrangements 46 rotatably support shafts 48, 48a, 50 and 50a, to one end of which planet gears or pinions 52, 52a, 54 and 54a, respectively, are keyed. The pinions 52, 52a, 54 and 54a are meshed with the teeth of idler gears 44 and, because of their equally spaced positions, 52 is diametrically opposite 52a, i.e., spaced from one another by 180°, and 54 is diametrically opposite 54a. As will have been surmised at this point, pinions 52 and 52a are associated with one acceleration-deceleration generator, whereas pinions 54 and 54a are associated with the other acceleration-deceleration generator of ADG's 14.

The other ends of shafts 50, 50a are nonrotatably affixed to links 56, 56a, respectively, each of which carries an eccentric pin 58, 58a thereon. The eccentricity is therefore fixed relative to the coincident axes of the associated shafts 50, 50a and pinions 54, 54a. The eccentric pins 58, 58a provide a pivotal connection with coupler links 60, 60a which, at their other ends, are pivotally connected to opposite ends of output link 62 by pins 64, 64a. Output link 62 is keyed to shaft 30, the two being adapted to rotate together about a location intermediate the pivotal connections to the coupler links. Since ADG output gear 34 is also keyed to shaft 30, any rotary movement imparted to shaft 30 by output link 62 will also be imparted to ADG output gear 34.

The other end of shafts 48, 48a are nonrotatably affixed to links 65, 65a, respectively, each of which carries an eccentric pin 66, 66a thereon. Eccentric pins 66, 66a pivotally connect with coupler links 68, 68a, the other ends of which are pivotally connected by pins 70, 70a to apertures 72, 72a in ADG output gear 74 rotatably mounted on bearing 75 on shaft 30. The apertures 72, 72a are spaced 180° from one another along a line of centers and the pin joint formed with the coupler links 68, 68a causes ADG output gear 74 to function as an output link.

Details regarding the design of the above-described ADG elements are well within the capabilities of those skilled in the machine design art. Bearing and pin sizes and materials, for example, can be varied as required by the load imposed by the equipment to be driven by the clutch. The specific manner of constructing the pin joints to prevent dissociation of the parts during operation and to maintain relative element positions are likewise optional design features which can be varied to suit the needs or individual preferences of the designer. FIG. 2 merely illustrates the securement of the pin of each pin joint to one of the pivoted members, as indicated on coupler link 60 by some means such as a setscrew 76. The other end of the pin could, of course, extend through and beyond the outward surface of the attached element and be restrained from relative lateral shifting movement by an appropriate annular groove-retaining ring arrangement or by any other well known means for performing a similar function.

From the above it will be recognized that one ADG comprises sun gear 36, idlers 44, pinions 52 and 52a, shafts 48, 48a, links 65, 65a, eccentric pins 66, 66a, coupler links 68, 68a and ADG output gear 74. The other ADG comprises sun gear 36, idlers 44, pinions 54, 54a, shafts 50, 50a, links 56, 56a, eccentric pins 58, 58a, coupler links 60, 60a and output link 62.

Although it is preferable to use ADG's 14 which are identical in every respect, the two can be made specifically different, if desired, using identical proportions but varying sizes in order to get identical cycles. Alternatively, of course, the cycles, proportions and sizes can specifically differ but the overall result must be such that the maximum and minimum output velocities achieved are as described previously and that such maximum and minimum fall at the same relative point in both of the output cycles. From the standpoint of parts standardization, economy of maintenance, performance, etc., identical ADG's are, as indicated above, preferable. In this respect, however, it will be noted that the preferred embodiment described herein utilizes only one sun gear which is operative with the idlers and pinions of both ADG units. Two sun gears could be used, one for each ADG, but this is unnecessary since the same proportions and sizes of the ADG components are employed in the described embodiment. In any event, since the proportions and sizes are identical and since only one sun gear is used, this means that each of the pinions 54, 54a, 52, 52a will be identical, i.e., will have a pitch diameter which is equal to one-half that of the sun gear. This, of course, is necessary in order to achieve the desired Cardan motion.

Since the pinions 54, 54a, 52, 52a are located about a line of centers concentric with the shaft 30, it will be realized that the circular path which the axes of the pinions follow upon rotation of the gear 26 will be identical. With respect to the proportions of the other components comprising each of the ADG units, the eccentricity of the eccentric pins 58, 58a, 66, 66a, i.e., the distance between the axis of each such pin and the axis of the pinion shaft 50, 50a, 48 or 48a associated therewith, is identical so that the ellipse traced by each pin is the same. The coupler links 60, 60a, 68, 68a are likewise identical in length, i.e., the distance between the axes of the pin joints thereon. Finally, the effective length of output link 62, i.e., the distance between the axis of pin 64 or 64a and the axis of shaft 30, matches the distance between the axis of apertures 72 or 72a of gear 74 and the axis of shaft 30.

For good transmission angles, smooth operation, minimized shock-loading and the like, the following proportions have been found preferable for ADG units of the type described:

A radius of the circular path of pinions 54, 54a, 48, 48a equal to about 1.00

An eccentricity of eccentric pins 58, 58a, 66, 66a equal to about 0.2

A length between the axes of the coupler link pin joints equal to about 0.8941

An output link length (between the axis of shaft 30 and the axis of each pin joint connection to a coupler link) equal to about 0.4119 These preferred parameters can, of course, be scaled up to any desired size, as may be required by the load to be imposed on the clutch. For example, if the radius of the circular path of the pinions is established at about 6 inches, then the eccentricity would be about 1.2 inches, the coupler link length about 5.365 inches, and the output link length to each coupler link would equal about 2.471 inches.

From the above it will also be understood that for each revolution of the ADG input gear 26, gears 74 and 34 will each rotate once during which each will have two cycles of variation in angular velocity, i.e., decelerating, hesitating, and accelerating. These cycles of the gears 74 and 34 will be out of phase with one another by approximately 90° of rotation of the ADG's input gear 26. The design of the alternative clutch drive means, hereinafter to be described, driven by the output of each ADG requires that each alternative drive means rotate once during each two revolutions of normal drive means 10 and that each revolution thereof comprise one cycle of angular velocity variation. This can be arranged by driving ADG input gear 26 at one-fourth the angular speed of shaft 18, a 1:4 gear ratio between gears 24 and 26, and by driving each alternative clutch drive means at twice the angular speed of the output links of each ADG unit, i.e., at double the rotational speed of output gear 74 and of output link 62 (and therefore of output gear 34). Thus, for each four revolutions of the normal drive means 10, the ADG input gear rotates once, producing one double cycled revolution of the ADG output gears 74 and 34 which, in turn, drive the associated alternative drive means two revolutions, each of which comprises one deceleration-hesitation-acceleration cycle of angular velocity. It will be noted therefore that the desired speed relationship of the normal drive means 10 and the alternative drive means is thereby achieved.

Figure 4:
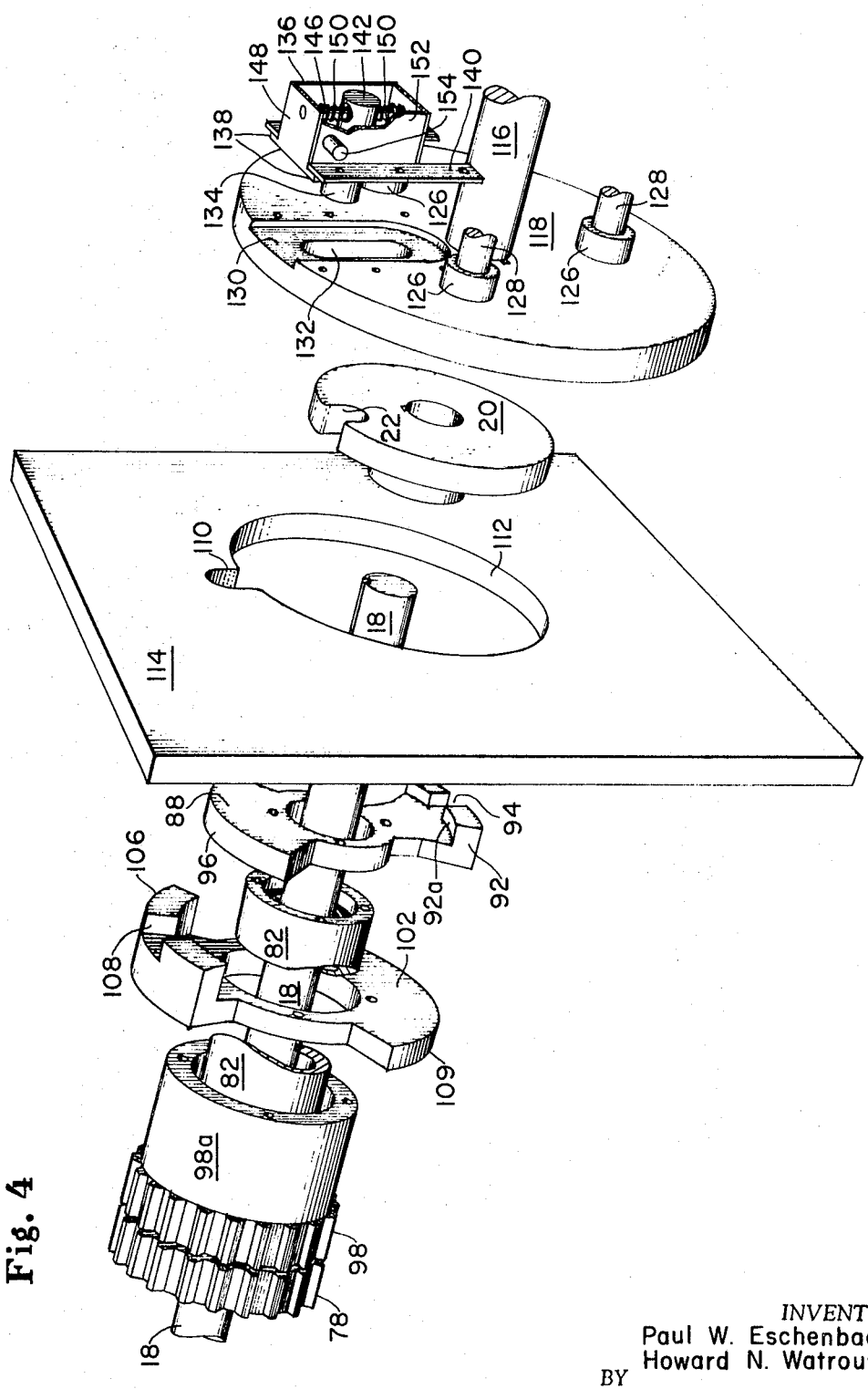
FIG. 4 is an enlarged exploded, fragmentary perspective view of the apparatus for selective control of the drive imparted to the output shaft of the clutch of FIGS. 1–3.

Referring to FIGS. 1 and 4, ADG output gear 74 is meshed with gear 78 which is freely rotatably mounted on shaft 18 by bearing 80. A torque tube 82 is attached to the hub of gear 78 by machine screws 84, the distal end thereof being supported in a fixed spacial relationship with shaft 18 by bearing 86. The distal end of torque tube 82 carries a clutch plate 88 juxtaposed the clutch plate 20, the attachment being effected by machine screws 90. As shown most clearly in FIG. 4, clutch plate 88 has a partially flanged periphery at 92 with a radially oriented slot 94 therethrough having a width approximating that of slot 22 in clutch plate 20. The flange 92 projects outwardly from clutch plate 88 to a position adjacent the periphery of clutch plate 20 so that when properly oriented, slots 22 and 94 will align. The specific shape of the clutch plate 88 is not important so long as it is consistent with the required strength and space limitations; however, it will be noted that in the illustrated embodiment it has been shaped to maintain dynamic balance by reason of the mass provided by enlarged lobe 96, which offsets the mass of the flange 92 on the opposite side. It will also be noted that the periphery of enlarged lobe 96 lies at a distance from the axis of shaft 18 which is smaller than the distance from such axis to the inwardly facing side 92a of flange 92. The reason for this relationship will be apparent from subsequent description.

Figure 3:
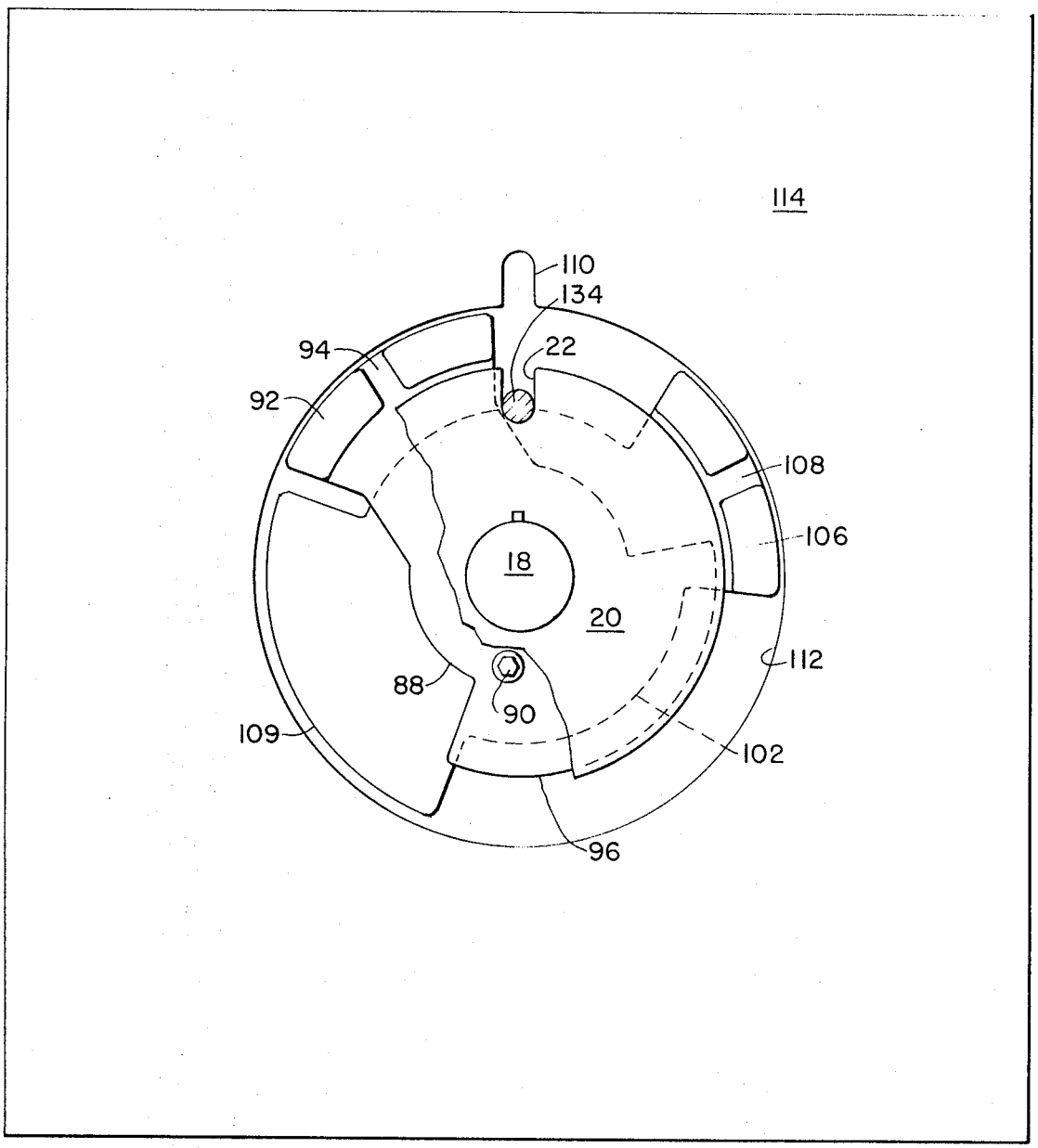
FIG. 3 is an enlarged sectional view taken along line 3—3 of FIG. 1.

ADG output gear 34 meshes with gear 98 which is freely rotatably mounted on torque tube 82 by bearings 100 and has an extended hub 98a to the extremity of which is affixed clutch plate 102 by machine screws 104. Clutch plate 102, which is juxtaposed clutch plate 88, has a partially flanged periphery at 106, as shown in FIG. 4, through which radially oriented slot 108 extends. Slot 108 has a depth and width corresponding to that of slot 94 of clutch plate 88. The flange 106 projects outwardly from clutch plate 102 beyond the periphery of lobe 96 of clutch plate 88 to a position adjacent the periphery of clutch plate 20 so that when properly oriented, slots 22 and 108 will also align. Clutch plate 102 also has an enlarged lobe 109 for dynamic balance purposes. Here, as in connection with clutch plate 102, the particular shape of the element may be varied to suit the space and strength requirements. Referring to FIG. 3, it will be noted that the flanges 92 and 106 are identically offset from the axis of shaft 18 and therefore share the same path of travel.

The clutch plate 88 and the associated machine parts transmitting power from the ADG output gear 74, herein generally referred to as an alternative drive means, and the clutch plate 102 and the associated machine parts transmitting power from the ADG output link 62, herein also generally referred to as an alternative drive means, are thus arranged so that they revolve in the same direction as the clutch plate 20 and so that their cyclical sinusoidal variations in angular velocity are out of phase with one another by 360° of rotation of the clutch plate 20 of normal drive means 10. In addition, the slots 94 and 108 are oriented so that the same occupy the identical radial position, hereinafter referred to as synchronous position or 0° position, at their respective points of maximum angular velocity. The slot 22 of clutch plate 20 is oriented so that during each revolution thereof it is aligned with the slot in the clutch plate of an alternative drive means at the synchronous position. Thus, during one revolution, slot 22 will align with slot 94 of clutch plate 88 at the synchronous position and during the next succeeding revolution the slot 22 will align with slot 108 of clutch plate 102 at the synchronous position. For clarity respecting the details of construction, the relative angular positions of the clutch plates are not accurately depicted in either FIG. 1 or FIG. 4.

Since the slots 94 and 108 are identically oriented at the synchronous position, it will be realized that the same is true with regard to their radial position at the points of minimum angular velocity. For an ADG unit designed in accordance with the preferred parameters, the point of minimum angular velocity will be radially spaced from the synchronous position by approximately 215° in the direction of rotation. This relationship determines the relative positions of a locking means, a slot 110 (see FIGS. 1 and 4) which extends radially outwardly from an aperture 112 in a stationary frame member 114 of the clutch, and the slots 94 and 108 when the clutch is assembled. The slot 110 has a width approximately the same as that of slots 22, 94 and 108. As seen most clearly in FIG. 1, the stationary frame member 114 is aligned with clutch plate 20 and with the path of travel of slots 94 and 108, the aperture 112 therein being slightly larger in diameter than the maximum peripheral dimension of clutch plate 102. Thus, the slots 94 and 108 of the flanges 92 and 106 rotate adjacent the surface defining aperture 112 and are each adapted to alternately align with the slot 110 at the point of minimum angular velocity in its cycle.

The approximate relative positions of the clutch plate 20 and the slots of the ADG units in operation are shown schematically in FIGS. 6A through 6E, wherein the reference ADG 1 has arbitrarily been assigned to the slotted flange of one and ADG 2 similarly assigned to the slotted flange of the other. In FIG. 6A, ADG 1 is in its synchronous position with its slot aligned with and traveling at the same velocity as slot 22 of clutch plate 20 and with ADG 2 approaching its minimum velocity. Next, as shown in FIG. 6B, ADG 2 is in its minimum velocity position and slot 22 of clutch plate 20 has moved through an angle of θ to a position herein referred to as θ position. ADG 1 is simultaneously commencing its deceleration phase. FIG. 6C shows an intermediate position with ADG 1 decelerating and ADG 2 accelerating. Then, as will be seen in FIG. 6D, ADG 2 reaches its synchronous position in alignment with slot 22 of clutch plate 20 and at a matching radial speed. ADG 1 is then approaching its minimum velocity position. FIG. 6E illustrates slot 22 in the θ position of the next cycle concurrently with ADG 1 having reached its position of minimum velocity. For an ADG unit designed with the preferred parameters, the angle θ will be equal to approximately 40°, a dimension which can be useful in setting up the clutch-sensing system, as hereinafter described.

The clutch output drive 12 comprises a clutch output shaft 116 which is keyed to a clutch output plate 118 contiguous to clutch plate 20. The clutch output shaft 116 and plate 118 are supported for rotation with their axes in alignment with clutch input shaft 18 by bearings 120 within a rigidly mounted bearing housing 122 affixed to the machine frame (not shown).

The external end of housing 122 is appropriately closed by seal member 124. Spaced at 120° along a line of centers on clutch output plate 118 are bosses 126, the centers of which are drilled to accept, in press fit relation, guide pins 128 the axes of which are parallel to one another and to the axis of clutch output shaft 116.

As shown most clearly in FIG. 4, clutch output plate 118 has a radially oriented slot 130 milled therein within which a through slot 132 is provided. The slot 132 has a width approximately the same as that of slots 22, 94 and 108 and 110 and a length sufficient to permit alignment with slot 22 of clutch plate 20, with either slot 94 or 108 of clutch plates 88 and 102, respectively, and with slot 110 in frame member 114. Thus, the inner end of the slot 132 can lie at approximately the same distance from the axis of output shaft 116 as the inner end of slot 22 lies from the axis of clutch input shaft 18 and the outer end of slot 132 can be spaced from the axis of output shaft 116 the same distance as the far end of slot 110 of frame member 114 is spaced from the axis of input shaft 18.

The means 16 for selective engagement of the clutch output drive 12 with the normal drive means 10, with either alternative drive means or with the above-described locking means, comprises an interlock member, drive pin 134, and actuator means for controlling the position thereof. The drive pin 134 is sized for sliding engagement with slots 132, 22, 94, 108 and 110, being telescoped through slot 132 and projecting outwardly therefrom in the direction of the adjacent clutch plates. Such projection is great enough for the drive pin 134 to make substantial engagement with the sidewalls of slots 22, 94, 108 and 110. As shown in FIG. 1, the projection is sufficient to extend completely through clutch plate 20.

In the preferred embodiment, the actuator means is adapted to cause the drive pin 34 to assume one of three radial positions: a first position in which the drive pin 134 can engage the slot 22 of clutch plate 20, a second position in which the drive pin 134 can engage with either slot 94 or 108 of clutch plates 88 and 102 and a third position in which the drive pin 134 can engage slot 110 of frame member 114. Referring to FIG. 4, it will be seen that the drive pin 134 is mounted within an enclosure 136 which is provided with side flanges 138 flush with its inner surface. The composite width of the inner surface of the enclosure 136 is such as to permit the same to slide smoothly back and forth along the radial length of slot 130 of clutch output plate 118, being held in place by gibs 140 mounted to the surface of the clutch output plate 118 adjacent the slot 130.

The body of the enclosure 136, which can be of any desired shape, is illustrated as a parallelepiped and is constructed in such a manner as to support the drive pin 134 in a spring-biased condition and extending in a direction generally parallel to the axis of output clutch plate 118. In this connection, the proximal end 142 of the drive pin 134 is through-drilled in a transverse direction and counterbored at each side (at the location denoted 144 in FIG. 1). A pin 146 (FIG. 4) extends between and is fastened to the end walls 148 of enclosure 136, passing through the hole drilled in drive pin 134. A compression spring 150 is placed around the pin 146 between the counterbore at each side of the drive pin 134 and the corresponding end wall 148 of the enclosure, thereby spring-loading the drive pin from both sides in the longitudinal direction of the enclosure 136. The sides 152 of the enclosure 136 are provided with oppositely disposed lugs 154 which extend outwardly in a direction parallel to and spaced from the inner surface of the enclosure 136.

The radial position of the enclosure 136, and therefore of the spring-loaded drive pin 134, is controlled by a pair of levers 156 (FIG. 1) of bellcrank shape which are pivotally mounted on shaft 158 extending between a pair of spaced supports 160 rigidly affixed by appropriate means to clutch output plate 118. One leg of each lever 156 is provided with a pin 162 and the other with a slot 164 adapted to receive the corresponding lug 154 of enclosure 136. Each pin 162 is received within a slot 166 of a projecting ear 168 welded to an actuating slide assembly 170, the ears being generally parallel and spaced by an amount equal to the distance between the outer surfaces of levers 156. The actuating slide assembly 170 has three longitudinally extending bearing members 172 firmly affixed thereto and within which the guide pins 128 attached to clutch output plate 118 are telescoped in sliding engagement. Thus, the guide pins 128 hold the actuating slide assembly 170 in coaxial and spaced relation to bearing housing 122, while facilitating sliding action in longitudinal directions.

A pair of spaced, parallel guide rings 174 are welded to the periphery of actuating slide assembly 170, forming an annular track therebetween, within which is loosely received a pair of oppositely disposed rollers 176 both of which are attached to a bifurcated lever, only the branches 178 of which are shown. The bifurcated lever is adapted to place the actuating slide assembly 170 in one of three positions along its sliding path in response to signals received from sensing means determining that one or more cycles of the clutch-operated equipment should be lost. The movement to such positions controls the radial positions of the enclosure 136 and the spring-loaded drive pin 134 carried therewith by the action of levers 156 in translating the sliding action of actuating slide assembly 170 into radial movement of the enclosure 136. As shown in FIG. 1, the actuating slide assembly 170 is in its right-hand position and drive pin 134 is in its first position wherein it can engage the slot 22 of clutch plate 20. If the actuating slide assembly 170 moves to the next, the middle, position, the drive pin 134 will move upwardly to its second position in which it can engage with either slot 94 or 108 of clutch plates 88 and 102. Finally, if the actuating slide assembly 170 moves to its left-hand position, the drive pin 134 will move upwardly to its third position in which it can engage with slot 110 of flange member 114.

The movement of the actuating slide assembly 170 to the various positions can be accomplished by many arrangements readily apparent to those of ordinary skill in the art and for that reason details with respect thereto are omitted. For example, the bifurcated lever could be pivotally mounted on the clutch housing or frame members and movement thereof accomplished by electrically, pneumatically or hydraulically operated powering and/or latching mechanisms controlled by a sensing system. The sensing system can, if desired be such as will hereinafter described, including a pair of electric eyes which are located at adjacent module stations and are, in combination with cam operated switches, capable of sensing conditions requiring movement of the actuating slide assembly 170 to particular positions.

FIG. 5 shows a binary logic diagram of a sensing system which can be used as a part of the actuating system in connection with the clutch of the present invention. This sensing system is merely exemplary, however, since other adequate systems could undoubtedly be developed by skilled designers. In any event, the system is presented in a manner which will be readily understood by those of ordinary skill in the controls art, using the familiar binary logic symbols for "NOT," "AND" and "flip-flop" elements. For the uninitiated, these are clearly described by: Bennett, W., "First Lesson in Binary Logic," *Product Engineering*, Jan. 8, 1962, p. 79 and Bennett, W., "Fourth Lesson in Binary Logic," *Product Engineering*, July 9, 1962, p. 47. It is possible to simplify the logic diagram in some respects; however, the diagram was maintained in its present form for clarity of disclosure.

$E_1$ and $E_2$ are electric eye devices which concurrently detect the presence or absence of modules at each of two adjacent module stations located, for example, along a bucket conveyor of a machine operating in conjunction with the equipment powered by the present clutch. Each cycle of detection is accomplished throughout a period corresponding to a revolution of the clutch's normal drive means, commencing at synchronous position. By the end of each detection cycle, the bucket which was previously scanned by the upstream electric eye, $E_1$, is carried to the scanning position of the downstream electric eye, $E_2$, and the next consecutive upstream bucket is carried to the scanning position of $E_1$. Thus, $E_2$ scans a particular bucket one cycle later than it was scanned by $E_1$. As indicated on the drawing, in the design of this sensing system the output of the electric eye is "ON" only when it is detected that a module is missing.

The exemplary system also includes three cam-operated switches: cam switch $C_1$ which is a normally open switch adapted to be closed by a cam when the clutch input shaft 18 reaches a position at which the slot 22 of associated clutch plate 20 is at a synchronous position; cam switch $C_2$, which is a normally open switch adapted to be closed by a cam switch when the clutch input shaft 18 reaches a position at which the slot 22 of associated clutch plate 20 is at the $\theta$ position previously described; and cam switch $C_3$, which is a normally open switch adapted to be closed by a cam when the clutch output shaft 116 reaches a position at which the slot 132 and drive pin 134 of the associated clutch output plate 118 are aligned with the locking means, slot 110 of frame member 114. The cams are not shown in FIGS. 1–4, but will be understood from FIG. 5 that the cams are mounted on their respective shafts adjacent the switches and that each has a single rise which is oriented to occur at the indicated position. As defined in the drawing, the outputs of the cam-operated switches are "ON" only at the times that the shafts are at their indicated positions and, consequently, regardless of the output of the electric eyes $E_1$ and $E_2$, the output of the AND elements will be "OFF" at other times. Thus, the flip-flops must remain in their existing states at such other times.

The flip-flop $F_1$ has an input W from AND $A_1$ and an input X from AND $A_2$. When W is turned "on" the output $S_1$ of flip-flop $F_1$ is "on" when X is turned "on" the output $S_1$ is "off." Similarly, flip-flop $F_2$ also has two opposing signals, an input Y from AND $A_3$ and an input Z from AND $A_4$. The output $S_2$ of flip-flop $F_2$ is "on" when Y is turned "on" and "off" when Z is turned "on." Once the output $S_1$ or $S_2$ is turned "on" it remains in this state until the opposing signal or input is turned "on," at which time the output $S_1$ or $S_2$ is turned "off" and so remains until it again receives the proper input signal to turn it "on."

When the outputs $S_2$ and/or $S_1$ are "on" this causes mechanisms associated therewith to move the bifurcated lever controlling the position of actuating slide assembly 170. In this connection, the sensing system and the outputs therefrom can be pneumatic, hydraulic, electrical, electronic, mechanical or optical, as desired by the designer, and therefore the structural and operational features which would be applicable to each specific type are not described herein. As indicated previously, the hardware which can be used to implement the sensing system is also a matter of selection as well within the design capability of those skilled in the art; however, one example of such mechanisms is a pair of hydraulic cylinders set up so that the movements of each are additive. This can comprise a compound system wherein the piston rod of a first hydraulic cylinder supports the body of a second hydraulic cylinder. The body of the first cylinder can be pivotally attached to a machine frame element and the piston rod of the second cylinder can be pivotally attached to the bifurcated lever. Thus, when neither cylinder is actuated the lever is in a fully retracted position, when a first cylinder is actuated the lever is moved to a central position and when both cylinders are actuated the lever is moved to its fully extended position. These positions can be made to correspond with the previously described positions of the actuating slide assembly 170 so that, for example, if the bifurcated lever is in its fully retracted position, the actuating slide assembly 170 is in its right-hand position, if the bifurcated lever is in its central position the actuating slide assembly is in its middle position and if the lever is in its fully extended position the actuating slide assembly is in its left-hand position.

For the mechanism described, one hydraulic cylinder is actuated for outward movement of its piston rod when $S_1$ is "on" and the other hydraulic cylinder is similarly actuated when $S_2$ is "on." The action is reversed when the signals are "off," the one cylinder retracting its piston rod when $S_1$ is "off" and the other cylinder retracting its piston rod when $S_2$ is "off." In order to place the bifurcated lever in its fully retracted position (wherein the actuating slide assembly 170 is in its right-hand position and the drive pin 134 is in its first position within the slot 22 of clutch plate 20) both $S_1$ and $S_2$ must be "off." If the bifurcated lever is to be placed in its middle position (with the actuating slide assembly 170 in its middle position and the drive pin 134 in its second position wherein it can enter either slot 94 or 108 of clutch plates 88 and 102) then $S_1$, must be "on" and $S_2$ must be "off." Finally, if the bifurcated lever is to be placed in its fully extended position (the actuating slide assembly 170 in its left-hand position and the drive pin 134 in its third, locked, position in which it can engage with slot 110 of flange member 114) then $S_1$ and $S_2$ must be "on."

It will be understood from FIG. 5 that the outputs $S_1$ and $S_2$ of the sensing system will be controlled so as to cause movement between positions to occur only at predetermined times corresponding with the cyclic variations in angular velocity of the alternative drive means previously described. For example, the actuating slide assembly 170 should be moved between the right-hand and center positions (moving the drive pin 134 between its first and second positions) only at the point in time approximately corresponding with that at which the maximum angular velocity of the appropriate alternative drive means is reached. At this time, the alternative drive means and the normal drive means 10 have reached their synchronous position, with the slots of the associated clutch plates in alignment, and the drive pin 134 is free to move from one to the other. Similarly, the actuating slide assembly 170 should be moved between the center and left-hand positions (moving the drive pin 134 between its second and third positions) only at the point in time approximately corresponding with that at which the minimum angular velocity of the appropriate alternative drive means, is reached, at the $\theta$ position of the normal drive means, wherein the slot in the clutch plate of the appropriate alternative drive means is in alignment with slot 110 of frame member 114. Movement of the actuating slide assembly 170 between the left and right-hand positions (moving the drive pin 134 between the third and first positions) without first passing through the center position is, of course, prevented in the illustrated embodiment.

The movements described above can be made at the approximate rather than precise times mentioned herein and in FIG. 6 because of the spring-loaded condition of the drive pin 134. This condition permits noncritical actuation to occur within a reasonably comfortable portion of the machine cycle in advance of the described times without damage to the machine components. As a matter of fact, it is desirable to have the cam-operated switches $C_1$, $C_2$ and $C_3$ close at least about 10° of rotation of its associated shaft in advance of the position indicated to remain in closed condition for about 10° of rotation following such position. This permits some latitude of error in timing and adjustment, in addition to allowing for the actuation time.

In operation, assuming the drive pin 134 is in engagement with the slot 22 of clutch plate 20, the clutch output drive 12 is driven at the same constant speed at the normal drive means. If the condition requiring a loss in cycle of the equipment driven by the clutch is a missing module on a bucket conveyor and a pair of electric eyes and the cam-operated switches previously described are being employed for sensing, it will be apparent that $S_1$ and $S_2$ are "off" and that a module is present at each of the module scanning stations. Assume also that the condition of the next consecutive 12 buckets is as follows:

| Bucket No | 1 | 2 | 3 | 4 | 5 | 6 | 7 | 8 | 9 | 10 | 11 | 12 |
|---|---|---|---|---|---|---|---|---|---|---|---|---|
| Module present |   | X |   |   | X | X |   |   |   | X | X | X |
| Module absent | X |   | X | X |   |   | X | X | X |   |   |   |

The sequence, as controlled by the cam-operated switches, and the resulting actions are as follows:

| Sensing step | $E_1$ | $E_2$ | $C_1$ | $C_2$ | $C_3$ | $S_1$ | $S_2$ | Resulting position of drive pin | Indicated revolution of clutch output shaft | ADG unit at or approaching lock position |
|---|---|---|---|---|---|---|---|---|---|---|
| 1a | 1 | 0 | 1 | 0 | 0 | 1 | 0 | 2nd-in ADG1 | #1 | #2. |
| 1b | 1 | 0 | 0 | 1 | 0 | 1 | 0 | 2nd-in ADG1 |  | #2 at. |
| 2a | 0 | 1 | 1 | 0 | 0 | 1 | 0 | 2nd-in ADG1 |  | #1. |
| 2b | 0 | 1 | 0 | 1 | 1 | 1 | 0 | 2nd-in ADG1 |  | #1 at. |
| 3a | 1 | 0 | 1 | 0 | 0 | 1 | 0 | 2nd-in ADG1 | #2 | #2. |
| 3b | 1 | 0 | 0 | 1 | 0 | 1 | 0 | 2nd-in ADG1 |  | #2 at. |
| 4a | 1 | 1 | 1 | 0 | 0 | 1 | 0 | 2nd-in ADG1 |  | #1. |
| 4b | 1 | 1 | 0 | 1 | 1 | 1 | 1 | 3rd-in lock |  | #1 at. |
| 5a | 0 | 1 | 1 | 0 | 1 | 1 | 1 | 3rd-in lock |  | #2. |
| 5b | 0 | 1 | 0 | 1 | 1 | 1 | 0 | 2nd-in ADG2 |  | #2 at. |
| 6a | 0 | 0 | 1 | 0 | 0 | 0 | 0 | 1st-in normal drive | #3 | #1. |
| 6b | 0 | 0 | 0 | 1 | 0 | 0 | 0 | 1st-in normal drive |  | #1 at. |
| 7a | 1 | 0 | 1 | 0 | 0 | 1 | 0 | 2nd-in ADG1 |  | #2. |
| 7b | 1 | 0 | 0 | 1 | 0 | 1 | 0 | 2nd-in ADG1 |  | #2 at. |
| 8a | 1 | 1 | 1 | 0 | 0 | 1 | 0 | 2nd-in ADG1 |  | #1. |
| 8b | 1 | 1 | 0 | 1 | 1 | 1 | 1 | 3rd-in lock | #4 | #1 at. |
| 9a | 1 | 1 | 1 | 0 | 1 | 1 | 1 | 3rd-in lock |  | #2. |
| 9b | 1 | 1 | 0 | 1 | 1 | 1 | 1 | 3rd-in lock |  | #2 at. |
| 10a | 0 | 1 | 1 | 0 | 1 | 1 | 1 | 3rd-in lock |  | #1. |
| 10b | 0 | 1 | 0 | 1 | 1 | 1 | 0 | 2nd-in ADG1 |  | #1 at. |
| 11a | 0 | 0 | 1 | 0 | 0 | 0 | 0 | 1st-in normal drive | #5 | #2. |
| 11b | 0 | 0 | 0 | 1 | 0 | 0 | 0 | 1st-in normal drive |  | #2 at. |
| 12a | 0 | 0 | 1 | 0 | 0 | 0 | 0 | 1st-in normal drive | #6 | #1. |
| 12b | 0 | 0 | 0 | 1 | 0 | 0 | 0 | 1st-in normal drive |  | #1 at. |

In the $E_1$ through $S_2$ columns of the above table, "0" means "off" and "1" means "on." Each "a" step occurs at the time the correspondingly numbered bucket e.g., bucket 7 for step 7a, moves into the scanning field of $E_1$, concurrently with an alternative drive means arriving at the synchronous position. Each "b" step occurs when the normal drive means reaches the $\theta$ position. It will be noted that switch $C_1$ is closed ("on") during "a" step and open ("off") during each "b" step, whereas the opposite is true for $C_2$. Switch $C_3$, on the other hand, is closed during step "a" when the drive pin 134 is in the lock (third) position and is likewise closed during step "b" when the drive pin 134 is in the lock (third) position or in the second position, with the ADG unit then aligned with the locking means. The switch $C_3$ will also close at other times when the drive pin 134 is in the first position, engaged with the normal drive means, but since this would require that $S_1$ be "off" it will be realized that there will be no response from the sensing system, and hence, these other times were not included in the above sequence.

From the above it is believed that the various changes in position of the bifurcated lever, actuating slide assembly 170 and drive pin 134 will be fully understood as the clutch output drive is selectively placed in engagement with the various drive means (or, alternatively, locked) for the conditions assumed, including the designated ADG unit location indicated in the table. With respect to such changes in position of the drive pin 134, it will also be understood that movement between its first and second positions occurs at about zero relative angular velocity and therefore no jolt or shock loading occurs. The same is true about movement between its second and its third positions. The spring-loaded condition of drive pin 134 permits actuation of such movements slightly in advance of the precise instant at which it is required and therefore eases the criticality of timing involved.

The assumed conditions do not include all possible variations, but are sufficiently extensive to provide those skilled in the art with a clear conception of the operation of the clutch in service. Regardless of the number or location of the modules which are missing, for example, the present clutch is able to sense and to deliver to the equipment it drives the proper number and sequence of cycles to enable it to stay in proper phase with the associated machinery.

Many modifications of the above invention may be made and it is not intended to hereby limit it to the particular embodiments shown or described. For example, it is feasible to use a clutch such as that of the present invention without the locking feature, if the elimination of alternative cycles will suffice. Similarly, while the normal and alternative drive means are preferably concentric and the clutch output shaft aligned with the clutch input shaft, these details can be changed as desired to conform to the particular needs of the equipment. The terms used in describing the invention are used in their descriptive sense and not as terms of limitations, it being intended that all equivalents thereof be included within the scope of the appended claims.

What is claimed is:

1. A cyclic phasing clutch comprising normal drive means rotating at constant speed, a clutch output drive adapted to transmit rotary motion to equipment driven by said clutch, a pair of acceleration-deceleration generators driven at a constant speed directly related to the speed of said normal drive means, said generators each having an output delivered to an alternative drive means rotating with cyclical sinusoidal variations in angular velocity with time such that one revolution of said alternative drive means occurs for each two revolutions of said normal drive means, said cyclical variations reaching a minimum angular velocity of about zero and a maximum angular velocity of about that of said normal drive means, said cyclical variations of each alternative drive means being similar but out of phase with one another by approximately 360° of rotation of said normal drive means, and means for selective engagement of said clutch output drive with said normal drive means and with either of said alternative drive means.

2. The cyclic phasing clutch of claim 1 in which said selective engagement with a said alternative drive means is adapted to occur at approximately the point of maximum angular velocity thereof.

3. The cyclic phasing clutch of claim 2 in which each of said acceleration-deceleration generators comprise a drag link having an elliptical input constraint.

4. The cyclic phasing clutch of claim 3 in which the elliptical input constraint of said drag link of each acceleration-deceleration generator is developed by an eccentric pin maintained in a fixed nonrotatable relationship with a pinion, said pinion being associated with a fixed gear having a pitch diameter double that of the pinion, said association permitting said pinion to remain in driving engagement with said gear while moving in a circular path, the center of said circular path corresponding with the axis of said gear, the drive to said generator serving to move said pinion in its circular path, said drag link including an output link which is mounted to rotate about one of its ends, said one end being adapted to drive the alternative drive means of the generator and the other end of said output link being pivoted to a coupler link extending to said eccentric pin.

5. The cyclic phasing clutch of claim 4 in which the said drag link parameters are based on the following relative lengths:
A. a radius of said circular path of about 1.0 unit;
B. a distance from the axis of said pinion to that of said eccentric pin of about 0.2 unit;
C. a coupler link length of about 0.8941 unit; and
D. an output link length of about 0.4119 unit.

6. The cyclic phasing clutch of claim 4 in which said gear and pinion form an epicyclic train with an idler gear intermediate the two.

7. The cyclic phasing clutch of claim 4 in which each generator has a pair of identically proportioned said drag links associated therewith, said drag links being oriented so that the pinions and eccentric pins thereof are associated with the same gear at positions spaced from one another by about 180° and simultaneously moved by the drive to said generator, the said one end of the output link of each of said drag links being adapted to cooperatively drive the alternative drive means of the generator with the axis of rotation of each said one end being coincident with the axis of said gear.

8. The cyclic phasing clutch of claim 1 in which said means for selective engagement also is adapted to alternatively engage said clutch output drive with a locking means to retain said clutch output drive in a stationary position.

9. The cyclic phasing clutch of claim 8 in which said selective engagement with said locking means is adapted to occur following the engagement of said clutch output drive with a said alternative drive means and at about the point in time approximately corresponding with that at which the minimum angular velocity of the engaged alternative drive means is reached 10. The cyclic phasing clutch of claim 9 in which the selective engagement with a said alternative drive means and with said normal drive means is adapted to occur at the point in time approximately corresponding with that at which the maximum angular velocity of the alternative drive means involved is reached.

11. The cyclic phasing clutch of claim 10 in which any selective engagement of said clutch output drive with the normal drive means and with said alternative drive means occurs at the same radial position of said clutch output shaft and in which any such selective engagement with said locking means occurs at a location spaced radially from said radial position.

12. The cyclic phasing clutch of claim 11 in which said location is spaced by approximately 215° in the direction of rotation of said output shaft.

13. The cyclic phasing clutch of claim 10 in which each of said acceleration-deceleration generators comprises a drag link having an elliptical input constraint.

14. The cyclic phasing clutch of claim 13 in which the elliptical input constraint of said drag link of each acceleration-deceleration generator is developed by an eccentric pin maintained in a fixed nonrotatable relationship with a pinion, said pinion being associated with a fixed gear having a pitch diameter double that of the pinion, said association permitting said pinion to remain in driving engagement with said gear while moving in a circular path, the center of said circular path corresponding with the axis of said gear, the drive to said generator serving to move said pinion in its circular path, said drag link including an output link which is mounted to rotate about one of its ends, said one end being adapted to drive the alternative drive means of the generator and the other end of said output link being pivoted to a coupler link extending to said eccentric pin.

15. The cyclic phasing clutch of claim 14 in which the said drag link parameters are based on the following relative lengths:
A. a radius of said circular path of about 1.0 unit;
B. a distance from the axis of said pinion to that of said eccentric pin of about 0.2 unit;
C. a coupler link length of about 0.8941 unit; and
D. an output link length of about 0.4119 unit.

16. The cyclic phasing clutch of claim 13 in which said gear and pinion form an epicyclic train with an idler gear intermediate the two.

17. The cyclic phasing clutch of claim 13 in which each generator has a pair of identically proportioned said drag links associated therewith, said drag links being oriented so that the pinions and eccentric pins thereof are associated with the same gear at positions spaced from one another by about 180° and simultaneously moved by the drive to said generator, the said one end of the output links of each of said drag links being adapted to cooperatively drive the alternative drive means of the generator with the axis of rotation of each said one end being coincident with the axis of said gear.

18. A cyclic phasing clutch comprising a constant speed clutch input shaft and a clutch output shaft in alignment with the clutch input shaft; a pair of acceleration-deceleration generators driven at a constant speed directly related to the speed of said clutch input shaft, each generator having an output shaft concentric with said clutch input shaft, each said generator producing a single-cyclical revolution of the associated generator output shaft for each two revolutions of constant speed input by said clutch input shaft, each revolution of a generator output shaft comprising a complete cycle in which angular velocity varies sinusoidally with time, decelerating from a maximum value approximately identical to that of said clutch input shaft, reaching an instantaneous value of about zero and accelerating to the said maximum value, the cyclical output of the generator output shafts being substantially identical and out of phase with one another by approximately 360° of clutch input shaft rotation; and means for selective engagement of said clutch output shaft with said clutch input shaft, with the output shaft of either generator and with a locking means to retain said clutch output shaft in a stationary position.

19. The cyclic phasing clutch of claim 18 in which each of the acceleration-deceleration generators comprises a drag link having an elliptical input constraint.

20. The cyclic phasing clutch of claim 19 in which the elliptical input constraint of said drag link of each acceleration-deceleration generator is developed by an eccentric pin maintained in a fixed nonrotatable relationship with a pinion, said pinion being associated with a fixed gear having a pitch diameter double that of the pinion, said association permitting said pinion to remain in driving engagement with said gear while moving in a circular path, the center of said circular path corresponding with the axis of said gear, the drive to said generator serving to move said pinion in its circular path, said drag link including an output link which is mounted to rotate about one of its ends, said one end being adapted to drive the output shaft of the generator and the other end of said output link being pivoted to a coupler link extending to said eccentric pin.

21. The cyclic phasing clutch of claim 20 in which said gear and pinion form an epicyclic train with an idler gear intermediate the two.

22. The cyclic phasing clutch of claim 20 in which the said drag link parameters are based on the following relative lengths:
   A. a radius of said circular path of about 1.0 unit;
   B. a distance from the axis of said pinion to that of said eccentric pin of about 0.2 unit;
   C. a coupler link length of about 0.8941 unit; and
   D. an output link length of about 0.4119 unit.

23. The cyclic phasing clutch of claim 20 in which each generator has a pair of identically proportioned said drag links associated therewith, said drag links being oriented so that the pinions and eccentric pins thereof are associated with the same gear at positions spaced from one another by about 180° and simultaneously moved by the drive to said generator, the said one end of the output links of each of said drag links being adapted to cooperatively drive the output shaft of the generator with the axis of rotation of each said one end being coincident with the axis of said gear.

24. The cyclic phasing clutch of claim 23 in which the said drag link parameters are based on the following relative lengths:
   A. a radius of said circular path of about 1.0 unit;
   B. a distance from the axis of said pinion to that of said eccentric pin of about 0.2 unit;
   C. a coupler link length of about 0.8941 unit; and
   D. an output link length of about 0.4119 unit.

25. The cyclic phasing clutch of claim 23 in which the output link of both said drag links of a generator are combined into an integral output link adapted to be rotated about a location intermediate the pivotal connections to the coupler links.

26. The cyclic phasing clutch of claim 18, in which said means for selective engagement comprises an interlock member drivingly connected to and adapted to move in a radial direction from said clutch output shaft to assume one of three alternative radial positions, a first said position in which said member can be engaged with said clutch input shaft, a second said position in which said member can be engaged with either of the output shafts of said generators and a third said position in which said member is engaged with said locking means, said clutch including actuator means for controlling the movement of said member.

27. The cyclic phasing clutch of claim 26 in which said actuator means causes movement of said member between said first and said second positions only at the point in time approximately corresponding with that at which the maximum angular velocity of an output shaft of a said generator is reached, movement between said second and third positions occurs only at the point in time approximately corresponding with that at which the minimum angular velocity of an output shaft of a said generator is reached and which prevents movement of said member between said first and said third positions without first moving to said second position.

28. The cyclic phasing clutch of claim 27 in which said locking means is a slot in a stationary frame member of said clutch. pg,38

29. The cyclic phasing clutch of claim 28 in which the output shafts of said generators and the clutch input shaft are each provided with a clutch plate having a radially oriented slot therein adapted to accept said member and in which said member is a spring-biased drive pin.

* * * * *